Figure 1:
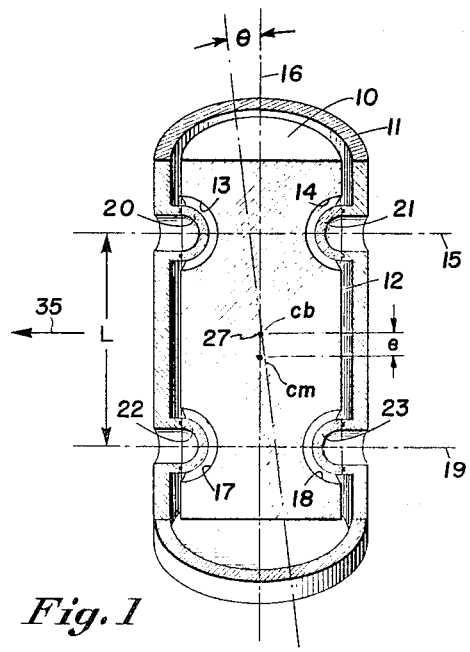

Oct. 25, 1966  D. L. ENSLEY  3,280,641
PENDULOUS ACCELEROMETER

Filed July 29, 1963  2 Sheets-Sheet 1

DONALD LUTHER ENSLEY
INVENTOR.

BY *D. Carl Richard*

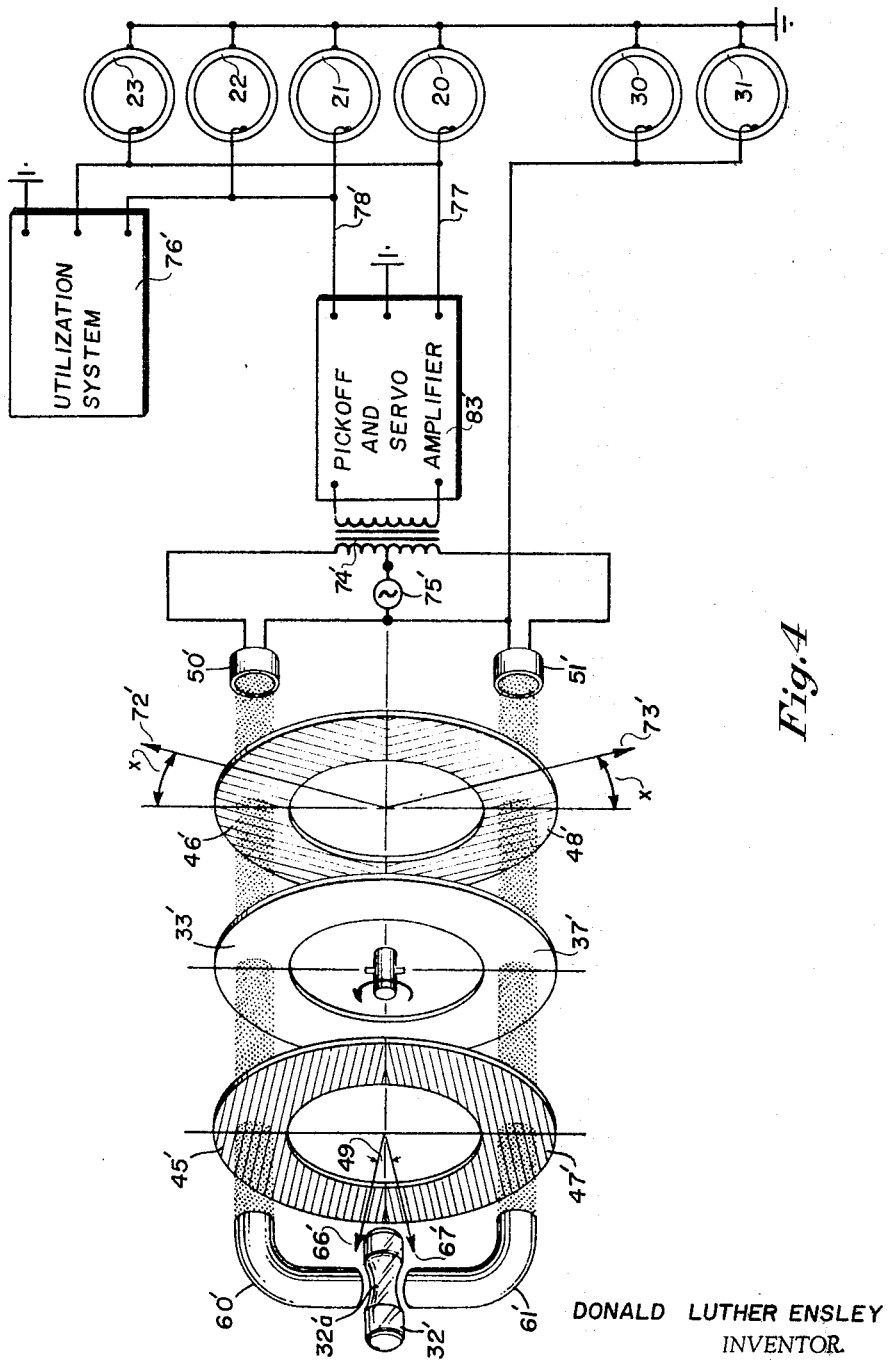

United States Patent Office 3,280,641
Patented Oct. 25, 1966

3,280,641
PENDULOUS ACCELEROMETER
Donald Luther Ensley, Hurst, Tex., assignor to Harvest Queen Mill & Elevator Company, Dallas, Tex., a corporation of Texas
Filed July 29, 1963, Ser. No. 298,181
5 Claims. (Cl. 73—516)

This application is a continuation-in-part of application Serial No. 113,546, filed May 29, 1961, now Patent No. 3,164,022, which in turn is a continuation-in-part of application Serial No. 778,673, filed December 8, 1958, now abandoned.

This invention relates to an accelerometer and more particularly to a system in which a reference element is naturally buoyant in a fluid with the center of mass displaced from the center of buoyancy to form a pendulous coupling responsive to horizontal components of acceleration.

As is well known, a body having a mass distribution will not rotate nor translate unless acted upon by net torques or forces. If such net forces or torques exist, the body reacts according to Newton's laws of motion. In many inertial reference systems, such as the gyroscope wheel, the inertia of the body is enhanced by rotation. However, more dynamic errors often are introduced by endeavoring to generate angular momentum than by not doing so.

The present invention eliminates many limitations of prior art systems in that an object of the present invention is to provide an ultrasonic linear accelerometer which is a spin-free reference system of reduced complexity and with a minimum of moving parts.

It is a further object of the invention to provide a support system which makes use, in a flotation unit, of mechanical radiation pressure gradients which are three-dimensionally inherently stable. It is a further object of the invention to provide a reference element supported by an ultrasonic field which is included in an optically actuated servo system to prevent the viscous coupling from reaching the element. A known density match is maintained between the reference element and a flotation liquid. A field system preferably is modulated in order to form a closed loop forced balance of the reference element.

In accordance with an embodiment of the invention, an accelerometer is provided in which an intertial reference element has a plurality of diametrically opposed concave surfaces. The element is housed in a flotation chamber unit. The unit is filled with a flotation fluid having a specific gravity substantially the same as the specific gravity of the element so that the element is neutrally buoyant. The center of mass is displaced from the center of buoyancy. Transducers generate ultrasonic fields in the flotation fluid resiliently to restrain the element at a reference position in the flotation chamber. Pick-off means generate a signal proportional to rotation of the element about a sensitive axis. Means are provided for modulating torque balance transducers in response to the pick-off signal for producing pressure differentials across the element to oppose the acceleration-dependent rotation.

Figure 2:
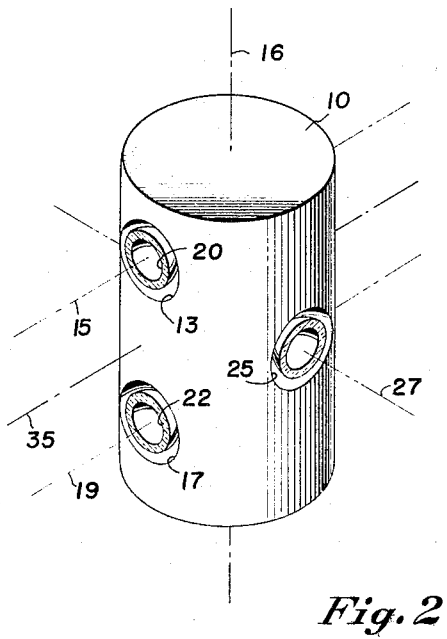
Figure 3:
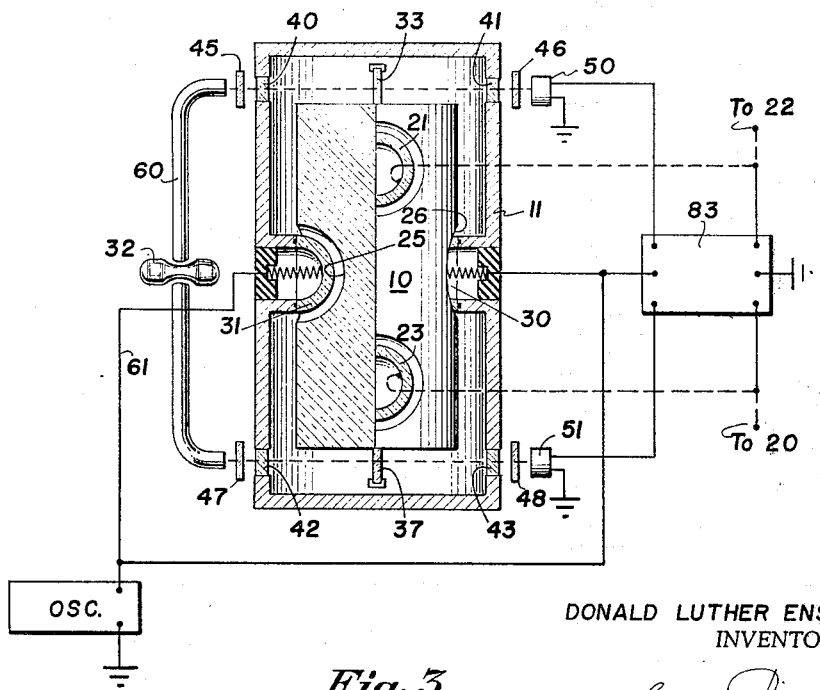

For a more complete understanding of the present invention and for further objects and advantages thereof, reference may now to had to the following description taken in conjunction with the accompanying drawings in which:

FIGURE 1 is a longitudinal sectional view of one embodiment of the invention;
FIGURE 2 is an isometric view of the reference element of FIGURE 1;
FIGURE 3 is a partial sectional view taken along a vertical plane which includes axis 27; and
FIGURE 4 diagrammatically illustrates an optical pick-off.

Referring to FIGURE 1, a cylindrical inertial element 10 is encased in a cylindrical housing 11. The inertial element is immersed in a fluid which fills the zone 12 between the case 11 and the element 10 where the fluid has a density substantially corresponding with the density of the element 10.

The element 10 is provided with six hemispherical cavities, four of which are shown in FIGURE 1. The cavities 13 and 14 at the upper end of the element 10 are diametrically opposite one another along a line 15 which intersects the longitudinal axis 16 of the element 10. Hemispherical cavities 17 and 18 near the lower end of element 10 are similarly located on line 19 which intersects axis 16.

Hemispherically-shaped ultrasonic transducers 20, 21, 22, and 23 are mounted on the inner wall of case 11 and extend into the cavities 13, 14, 17, and 18, respectively. The transducers 20–23 are piezoelectric shells which are adapted to be energized by high frequency current. Each transducer produces a divergent pressure field which coacts with the element 10 to provide a resilient suspension for element 10. The support field thus produced will normally maintain element 10 in a fixed position in the housing 11.

The operation of the system is based primarly upon control of a neutrally buoyant inertial element 10 in chamber 11 and the generation of a time average radiation pressure in the fluid. It may readily be shown that the first order propagation equation for excitation of the transducers 20–23 is as follows:

$$C^2(\nabla^2\phi) - \frac{\partial^2\phi}{\partial t^2} = 0 \text{ (Linear Response)} \qquad (1)$$

where:

C is the phase velocity of the sound generated by the transducers 20–23;
$\phi$ is the velocity potential of the sound field;
$\partial^2/\partial t^2$ is the second derivative with respect to time; and
$\nabla$ is a differential operator.

The second order propagation may be shown to correspond with the following expression:

$$C^2(\nabla^2\phi) - \frac{\partial^2\phi}{\partial t^2} + \frac{\partial}{\partial t}(\nabla\phi)^2 - (n-1)\frac{\partial\phi}{\partial t}\nabla^2\phi = 0 \qquad (2)$$

where:

$n$ is the power in the polytropic relationship between pressure and density $$\frac{P}{P_0} = \left(\frac{\rho}{\rho_0}\right)^n$$

with $P_0$ and $\rho_0$ being undisturbed pressure and density and P and $\rho$ being reference pressure and density.

From Equation 2, it can be shown that the time average radiation pressure $P_a$ is expressed by the following relationship:

$$P_a = \frac{\rho_0}{2}\left[\frac{1}{C^2}\left(\frac{\partial\phi}{\partial t}\right)^2 - \overline{(\nabla\phi)^2}\right] \qquad (3)$$

where:

$\rho_0$ is the density of the undisturbed fluid in which the sound field is generated.

A suitable flotation fluid may be a mixture of tetra-bromo-ethane and m-bromo-toluene of such proportions that the specific gravity differs from the specific gravity of the reference element to the degree desired, depending upon the sensitivity desired.

The element 10 may be a quartz cylinder with hemispherically concave cavities 13, 14, 17, and 18 therein.

The fifth cavity 25, also hemispherical in shape, is formed in the surface of the element 10 on an axis 27 which is mutually perpendicular to the plane common to lines 15 and 19. Axis 27 also is perpendicular to the axis 16 of the element 10.

A sixth cavity (not shown) also lies on axis 27 and is located diametrically opposed to cavity 25. The relative orientation of cavities 13, 14, 17, 18, and 25 is shown in FIGURE 2. FIGURE 3 illustrates the relative orientation of cavity 25 and its mating cavity 26. Hemispherical transducers 30 and 31 extend into cavities 25 and 26, respectively.

As illustrated in FIGURE 1, the center of buoyancy $cb$ of element 10 is located at the intersection of axes 16 and 27. However, the element 10 is so formed that the center of mass $cm$ is displaced below the center of buoyancy by a distance $e$. Thus, a sensitive axis 35 is parallel to lines 15 and 19 and passes through the intersection of axes 16 and 27.

Upon acceleration ($g$), as along the sensitive axis 35, a torque ($t_g$) develops which may be as follows:

$$t_g = mge \qquad (4)$$

where:

$m$ is the mass of element 10.

The torque thus produced interacts with the forces generated by the transducers 20-23.

Transducers 20-23 are driven by a signal from a pick-off system which senses rotation of element 10 about axis 27. Upon acceleration in the direction of the sensitive axis 35, element 10 will tend to be rotated in housing 11 as to tilt the axis 16 through an angle $\theta$. Thus the element rotates about axis 27 on the resilient support provided by the transducers 30 and 31. The pick-off includes a light source 32 from which a pair of light beams are directed through the housing 11 to sense rotation of element 10 about axis 27. More particularly, four apertures in the housing are sealed by clear strain-free glass disks 40, 41, 42, and 43. Polarizing plates 45 and 46 are aligned with disks 40 and 41. Polarizing plates 47 and 48 are aligned with disks 42 and 43. An optically active wave plate 33 is mounted on top of the inertial element 10 and a like plate 37 is mounted on the bottom. A polarized light beam transmitted through plates 45 and 46 passes through the wave plate 33. Similarly, a polarized beam passes through wave plate 37.

Light beams passing through the housing 11 are detected by two photocells 50 and 51. Plates 33 and 37 are preferably π-wave plates.

The optical system thus described is functionally illustrated in FIGURE 4 wherein elements have been given the same reference characters as in FIGURES 1-3 with a prime (') added. The light source 32 is a gas-filled bulb that is to be excited by a radio frequency voltage. Light emanating from the constriction 32a in the bulb 32 is piped by fiber optical light pipes 60' and 61' for passage through Polaroid plates 45' and 47'. The optical axes of plates 45' and 47' are divergent at slight angles $x$ from the boundaries between them.

Beams of light passing from light pipes 60' and 61' pass through elements 46' and 48' and are thus polarized in the directions of arrows 66' and 67', respectively. The light beams then pass through polarizers 46' and 48' which have their optical axes oriented 90° with reference to the arrows 66' and 67', respectively. The optical axis of element 46' corresponds with the arrow 72'. The optical axis of element 48' corresponds with the arrow 73'. Photocells 50' and 51' are disposed in alignment with the beams from elements 46' and 48', respectively. Thus, as the π-wave plates 33' and 37' rotate, the output signals from cells 50' and 51' will pass cyclically through maxima and minima voltages.

The cells 50' and 51' are connected in series opposition and to a transformer 74'. They are also connected to a voltage source 75'. The secondary winding of transformer 74' forms the input of a servo amplifier 83'.

By arranging the axes of the plates 45' and 47' at a very small angle $x$ and employing an angle $x+90°$ for the separation between the axes of plates 46' and 48', the use thereof, together with half-wave plates 33' and 37', provides extremely high optical amplification of any rotational displacement of the plates 33' and 37'.

It will now be recognized that the disks 45-48 of FIGURE 3 may be but limited portions of the elements 45'-48' of FIGURE 4. Complete elements in circular form have been shown in FIGURE 4 in order clearly to portray the orientation of the optical axes of the elements. Further, plates 33 and 37 may be considered to correspond with sections of plates 33' and 37' of FIGURE 4.

In FIGURE 3 the system is such that at rest, the output signal normally is a null signal. Upon acceleration, the element 10 tends to rotate on axis 27. The plates 33 and 37 rotate in the light beams to produce an output signal. The output signal is dependent in magnitude upon the extent of rotation and has a polarity representative of the direction or sense of the rotation.

The output signal is employed in a servo feedback system to balance the forces on element 10. More particularly, the signals from photocells 50 and 51 are employed to control the force field produced by the torque balance transducers 20-23. At equilibrium, the force equation is as follows:

$$g = \left[\frac{\theta L}{me}\right] F \qquad (5)$$

where:

$L$, $m$, and $e$ are the functions indicated in FIGURE 1; and $F$ is the applied acceleration.

The power required to maintain the element 10 at equilibrium when under acceleration is a direct measure of the acceleration. The power is measured as indicated in FIGURE 4 at the output of servo amplifier 83'. The photocells 50', 51' and transformer 74' form arms of a Wheatstone bridge, the output of which is applied to the unit 83'. Utilization system 76' is connected to the output of the unit 83'. The transducers 20 and 23 are connected in parallel and to output channel 77'. Transducers 21 and 22 are connected in parallel and to output channel 78'. Thus, as the bridge which includes detectors 50' and 51' becomes unbalanced, the excitation of transducers 20 and 23 will change in one sense. Concomitantly, the excitation of transducers 21 and 22 will change in an opposite sense. The polarity of the driving connections is such that a forced balance is maintained as between the position of the element 10 and the housing 11.

In FIGURE 3, the unit 83 including the pick-off and servo amplifier 83' is illustrated as connected at its input to cells 50 and 51, and at its output to transducers 21, 22 and 20, 23, respectively. Transducers 20-23 and 30 and 31 may be energized from voltage generator 75' in the frequency range of from about one-half to about 10 megacycles. The excitation for transducers 30 and 31 is regulated at a constant level. Transducers 20-23 are energized at levels dependent upon the acceleration. The control may be such that the high frequency excitation voltage is pulse time modulated to control the restoring force on the element 10.

Alternatively, a capacitance dependent pick-off unit may be employed rather than the optical pick-off of FIGURES 1-4. It may be as described in parent application Serial No. 113,546, filed May 29, 1961, with the servo amplifier and pulse time modulation for force control of the type disclosed in co-pending application Serial No. 298,147, filed July 29, 1963.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an accelerometer, the combination which comprises:
   (a) a housing filled with a flotation fluid,
   (b) a cylindrical inertial reference element neutrally buoyant in said fluid and having its center of mass displaced longitudinally from its center of buoyancy,
   (c) ultrasonic pressure field means at a central horizontal axis for resiliently positioning said element as to permit rotational displacements about said center of buoyancy, and
   (d) ultrasonic pressure field means positioned both above and below said axis on horizontal lines lying in a plane perpendicular to said axis for resiliently opposing said rotation.

2. In an accelerometer, the combination which comprises:
   (a) a housing filled with a flotation fluid,
   (b) an inertial reference element neutrally buoyant in said fluid and having its center of mass displaced from its center of buoyancy,
   (c) primary ultrasonic pressure field means for resiliently positioning said element as to permit rotational displacements about a horizontal axis passing through said center of bouyancy,
   (d) secondary ultrasonic pressure field means for resiliently opposing rotation about said axis,
   (e) a circuit including means for sensing rotation of said element about said axis and connected to said secondary field means for differential control of power applied thereto, and
   (f) means for measuring said power.

3. An accelerometer detector unit which comprises:
   (a) a housing filled with a flotation fluid,
   (b) an inertial reference element neutrally buoyant in said fluid and having its center of mass displaced from its center of buoyancy,
   (c) a first pair of ultrasonic transducers mounted on opposite sides of said housing on a horizontal axis perpendicular to a line passing through the center of mass and center of buoyancy, said transducers extending into cavities in said element at said axis,
   (d) a second pair of ultrasonic transducers mounted on opposite sides of said housing above said axis and extending into cavities in said element along a first horizontal line which is in a plane perpendicular to said axis, and
   (e) a third pair of ultrasonic transducers mounted on said housing below said axis and extending into cavities in said element which lie along a second horizontal line which is parallel to said first line.

4. An accelerometer detector unit which comprises:
   (a) a vertical cylindrical housing filled with a flotation fluid,
   (b) a cylindrical inertial reference element neutrally bouyant in said fluid and having its center of mass displaced from its center of buoyancy and having six hemispherical cavities therein,
   (c) a first pair of hemispherical ultrasonic transducers mounted on opposite sides of said housing at an axis passing through the center of buoyancy and extending into two of said cavities at said axis,
   (d) a second pair of hemispherical ultrasonic transducers mounted on opposite sides of said housing above said axis and extending into two of said cavities on a first horizontal line which is in a plane perpendicular to said axis, and
   (e) a third pair of hemispherical ultrasonic transducers mounted on said housing below said axis and extending into two of said cavities on a second horizontal line which is parallel to said first line.

5. An accelerometer detector unit which comprises:
   (a) an elongated cylindrical housing filled with a flotation fluid,
   (b) an elongated cylindrical inertial reference element neutrally buoyant in said fluid and having its center of mass displaced from its center of buoyancy and having six hemispherical-shaped cavities therein arranged in three diametrically opposed pairs,
   (c) a first pair of hemispherical ultrasonic transducers mounted on opposite sides of said housing on a central horizontal axis perpendicular to a line passing through the center of mass and center of buoyancy, said transducers extending in spaced apart relation into a first pair of said cavities at said axis,
   (d) a second pair of hemispherical ultrasonic transducers mounted on opposite sides of said housing above said axis and in spaced apart relation extending into a second pair of said cavities which lie along a first horizontal line which is in a plane perpendicular to said axis, and
   (e) a third pair of hemispherical ultrasonic transducers mounted on opposite sides of said housing below said axis and extending in spaced apart relation into a third pair of said cavities which lie along a second horizontal line which is parallel to said first line.

References Cited by the Examiner

UNITED STATES PATENTS

| | | | |
|---|---|---|---|
| 3,001,407 | 9/1961 | Wiancko et al. | 73—516 |
| 3,078,721 | 2/1963 | Sawyer | 73—516 |

RICHARD C. QUEISSER, *Primary Examiner.*

JAMES J. GILL, *Examiner.*